INVENTOR.
Robert J. Hickin
BY Pendleton, Neuman, Seibold and Williams
Attorneys

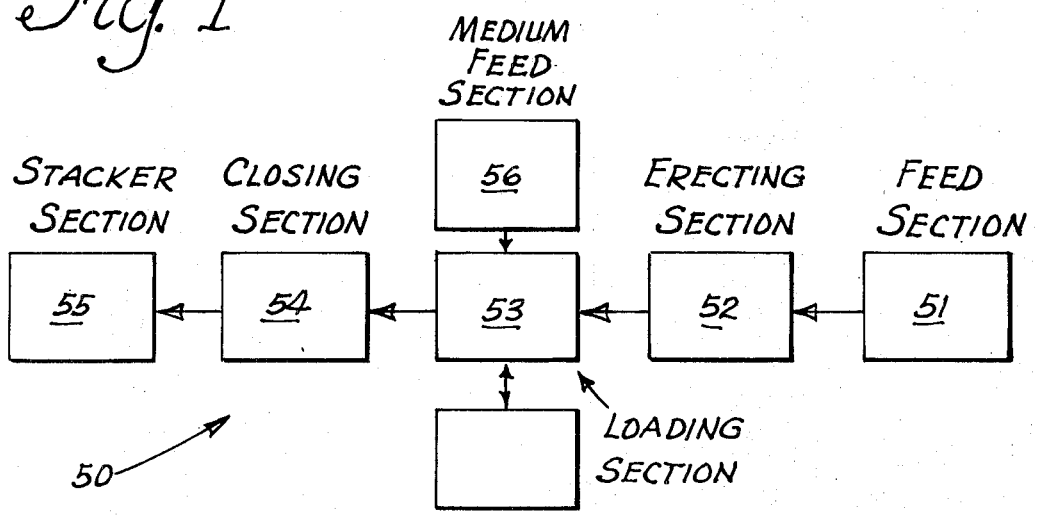
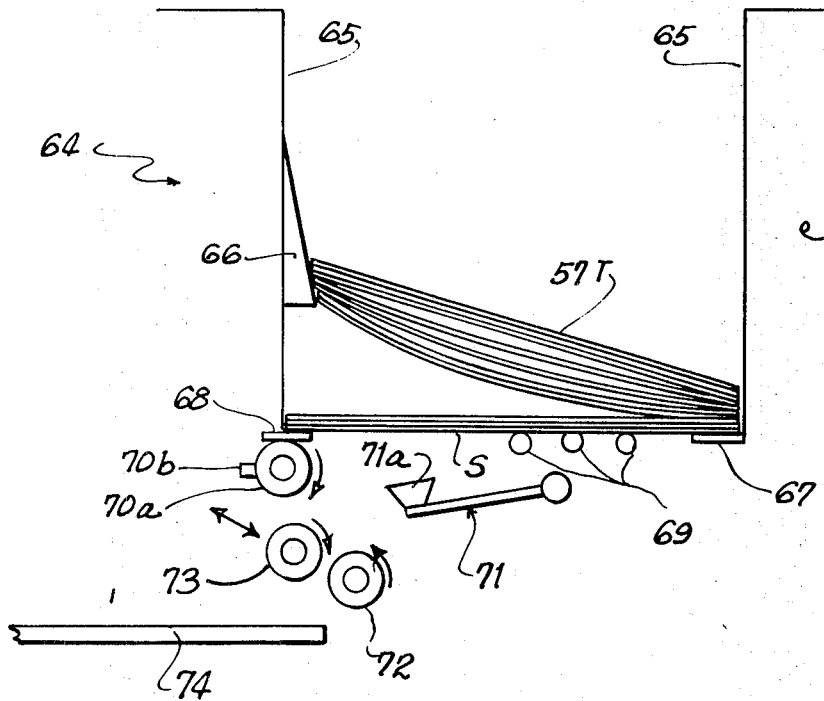

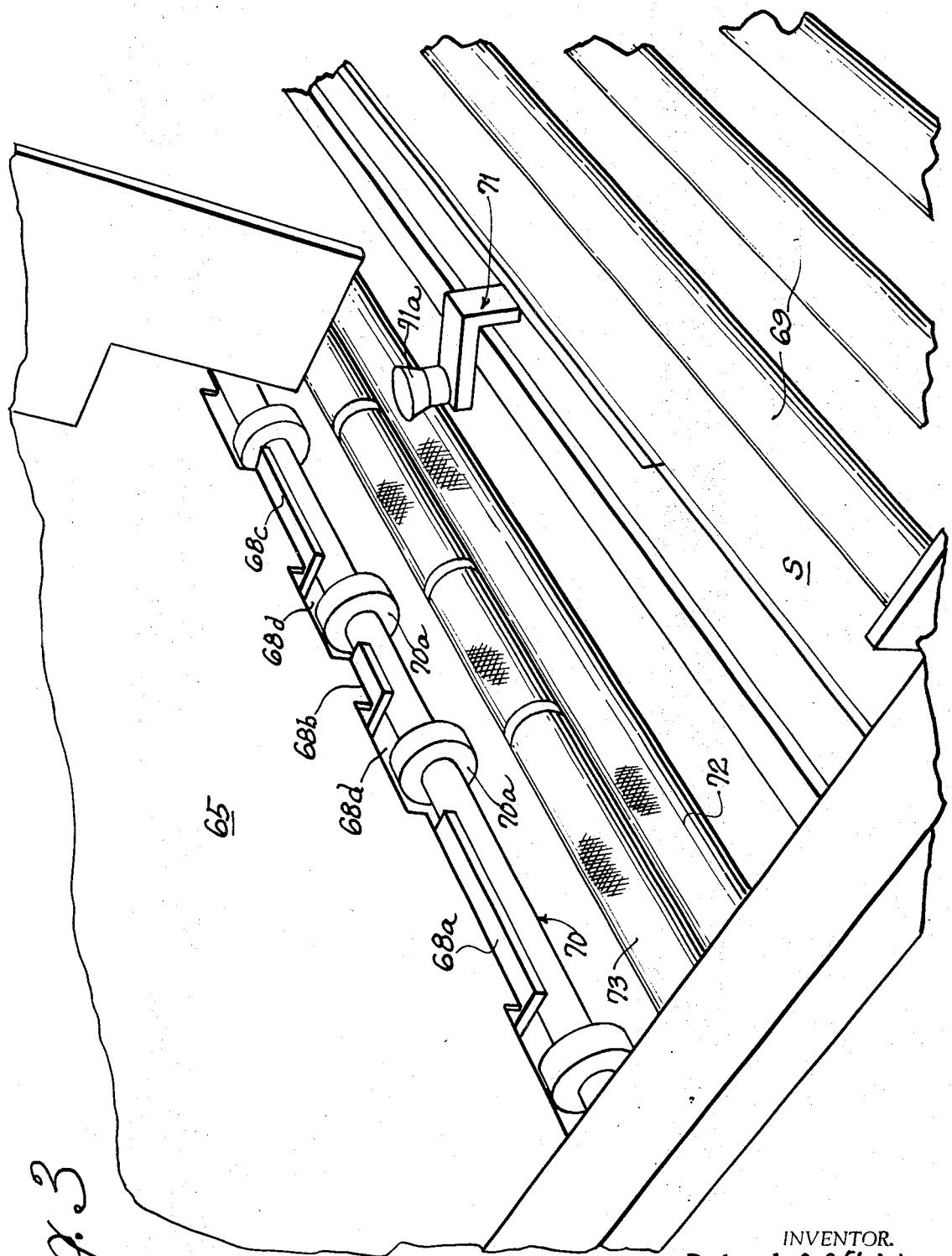

INVENTOR.
Robert J. Hickin
BY Pendleton, Neuman,
Seibold and Williams
Attorneys

Nov. 24, 1970   R. J. HICKIN   3,541,760
CARTON LOADING APPARATUS
Filed Feb. 16, 1968   15 Sheets-Sheet 11

INVENTOR.
Robert J. Hickin
BY Pendleton, Neuman,
Seibold and Williams
Attorneys

United States Patent Office 3,541,760
Patented Nov. 24, 1970

3,541,760
CARTON LOADING APPARATUS
Robert J. Hickin, Seville, Ohio, assignor to Packaging Corporation of America, Evanston, Ill., a corporation of Delaware
Filed Feb. 16, 1968, Ser. No. 707,386
Int. Cl. B65b 5/02, 19/18
U.S. Cl. 53—186
12 Claims

ABSTRACT OF THE DISCLOSURE

This disclosure relates to an apparatus which is adapted to successively receive individual collapsed tubular cartons, the latter having broad top and bottom panels foldably interconnected by narrow side panels and narrow end flaps. Subsequent to receiving the collapsed tubular cartons, the apparatus causes said cartons to be set up to form erected carton tubes open at opposite ends and while in such condition load each carton tube with a thin pliable product, and then effect discharge of the loaded tubes.

BACKGROUND OF THE INVENTION

Packaging of thin pliable products in shallow cartons or frame-like members has heretofore been a slow, awkward, and costly operation involving a substantial amount of manual labor. Because of the inherent flimsy characteristics of the product, (e.g., a filter pad utilized in an air filter unit for a domestic hot air furnace or the like) and the similar inherent characteristics of the carton or frame-like member in which said product is disposed, it was deemed impractical to handle such components mechanically, where accurate or precision spotting of the product within the carton was required.

Furthermore, the frame-like members previously utilized to house the product, such as filter pads, were generally constructed of a plurality of component parts such as (a) two thin metallic perforated sheets or inserts overlying the top surface and subtending the bottom surface of the pad, (b) narrow fiberboard strips folded to form a frame which delimited the peripheries of the pad and metallic sheets, (c) gummed tape for retaining the frame in a unitary condition, and (d) staples or suitable fasteners for connecting the metallic sheets to the frame, and the pad to the sheets. To assemble such parts to form the complete filter unit required considerable dexterity and patience on the part of the assembler, with the result that the hourly production rate per assembler was low.

To overcome the problem of assembling the frame-like member, a unitary member embodying the well-known folding carton concept was developed. Such a unitary member is disclosed in my copending application Serial No. 609,258 filed Jan. 13, 1967 and now abandoned. While the formation of the blank for such a unitary member and the partial folding thereof to form a collapsed tubular structure could be readily accomplished by conventional blank forming and folding machinery and thereby eliminate certain difficult problems associated with the filter unit manufacturing industry, there still remained, however, equally perplexing problems concerning setting up, loading, and closing of such unitary members in an expeditious manner and without requiring an inordinate amount of manual handling or manipulation.

SUMMARY OF THE INVENTION

Thus, it is an object of this invention to provide an apparatus which will automatically and mechanically perform in sequence the steps of setting up, loading, and closing such unitary members in a smooth and expeditious manner.

It is a further object of this invention to provide an apparatus of the class described which is capable of accommodating products and cartons therefor which vary in size over a wide range.

It is a still further object of this invention to provide an apparatus which has an hourly output capacity far exceeding that of a skilled and experienced assembler.

Further and additional objects will appear from the description, accompanying drawings and appended claims.

In accordance with one embodiment of this invention an apparatus is provided for loading a folding carton with a thin pliable product. The carton in its initial condition is that of a collapsed tubular structure which is provided with broad top and bottom panels having opposed first peripheral portions thereof interconnected by narrow side panels and end flaps extending laterally outwardly from opposed second peripheral portions. The apparatus comprises a first conveyor means which is adapted to successively move in one horizontal direction the collapsed tubular cartons with the broad bottom panel of each carton facing downwardly and a first peripheral portion of the top panel defining the leading edge of the moving carton.

The apparatus is provided with an erection section through which the collapsed tubular cartons are caused to pass by said first conveyor means. The erection section includes a first means disposed adjacent the path of movement of the first conveyor means and is engaged by at least the end flaps connected to the carton top panel causing same to be folded to upright positions. A yieldable element is also provided which is mounted within the path of the carton movement and is adapted to engage the carton leading edge causing a drag to be imposed on the top panel whereby same is moved relative to the bottom panel and the carton is set up to form an erected carton tube open at opposite ends.

The apparatus also includes a loading section which is disposed downstream of the erection section. The loading section comprises a well having a first station aligned with the path of movement of the erected carton tube by said first conveyor means, an intermediate station spaced beneath said first station, and a third station spaced beneath said intermediate station. A transfer means is provided which is adapted to move an erected carton tube from the first station to the intermediate station. A reciprocating load means is also provided which, upon the carton tube being disposed at the intermediate station, is adapted to extend through the open ends of the carton tube, engage a product, pull the product into the carton tube, release the product within the tube when the product is aligned with the carton top and bottom panels, and withdraw from the loaded carton tube. Upon the load means assuming a withdrawn position the loaded carton is released from the intermediate station and moves to the third station whereupon the loaded carton is moved away from the loading section by a second conveyor means.

DESCRIPTION OF THE DRAWINGS

For a more complete understanding of the invention reference should be made to the drawings wherein:

FIG. 1 is a diagrammatic view showing the relative disposition of the various sections comprising one form of the improved apparatus;

FIG. 2 is a fragmentary diagrammatic view showing one form of a feed section incorporated in said improved apparatus;

FIG. 3 is an enlarged, fragmentary perspective view taken from above of the feed section of FIG. 2 and with the stack of collapsed tubular cartons removed;

DESCRIPTION

Figure 4:
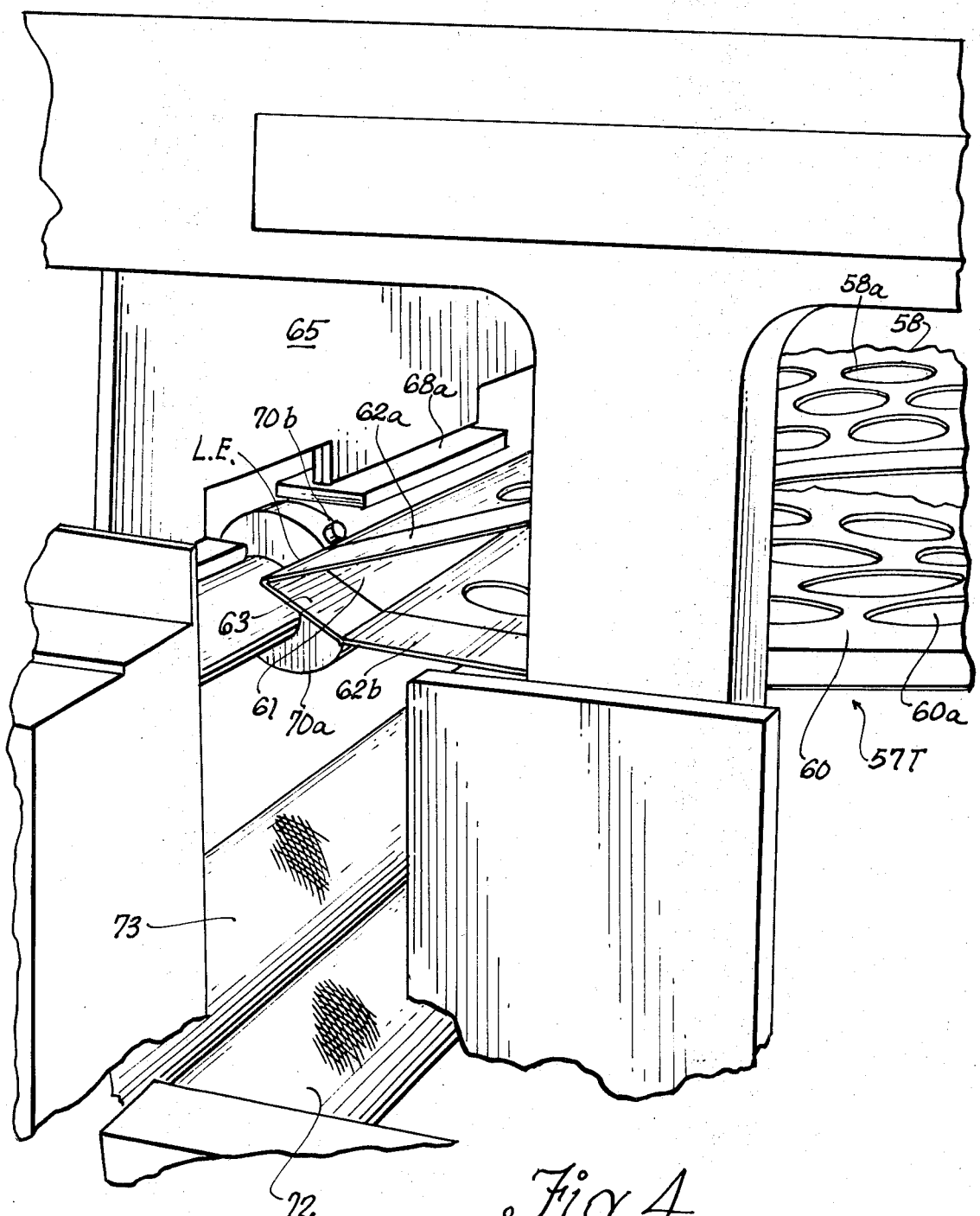
FIG. 4 is an enlarged fragmentary perspective view of one side of the feed section shown in FIG. 2 and showing the lowermost collapsed tubular carton of the stack being stripped from a supporting ledge formed in said feed section.

Referring now to the drawings and more particularly to FIG. 1, a diagrammatic view of one form of the improved apparatus 50 is shown. Apparatus 50 in the illustrated embodiment includes the following sections: feed section 51, erecting section 52, loading section 53, closing section 54, and an optional stacker section 55. Associated with the loading section 53 and disposed to one side thereof is a medium feed section 56 which in this instance forms no part of the improved apparatus. Each of the aforenoted sections will be described in detail hereinafter.

Figure 16:
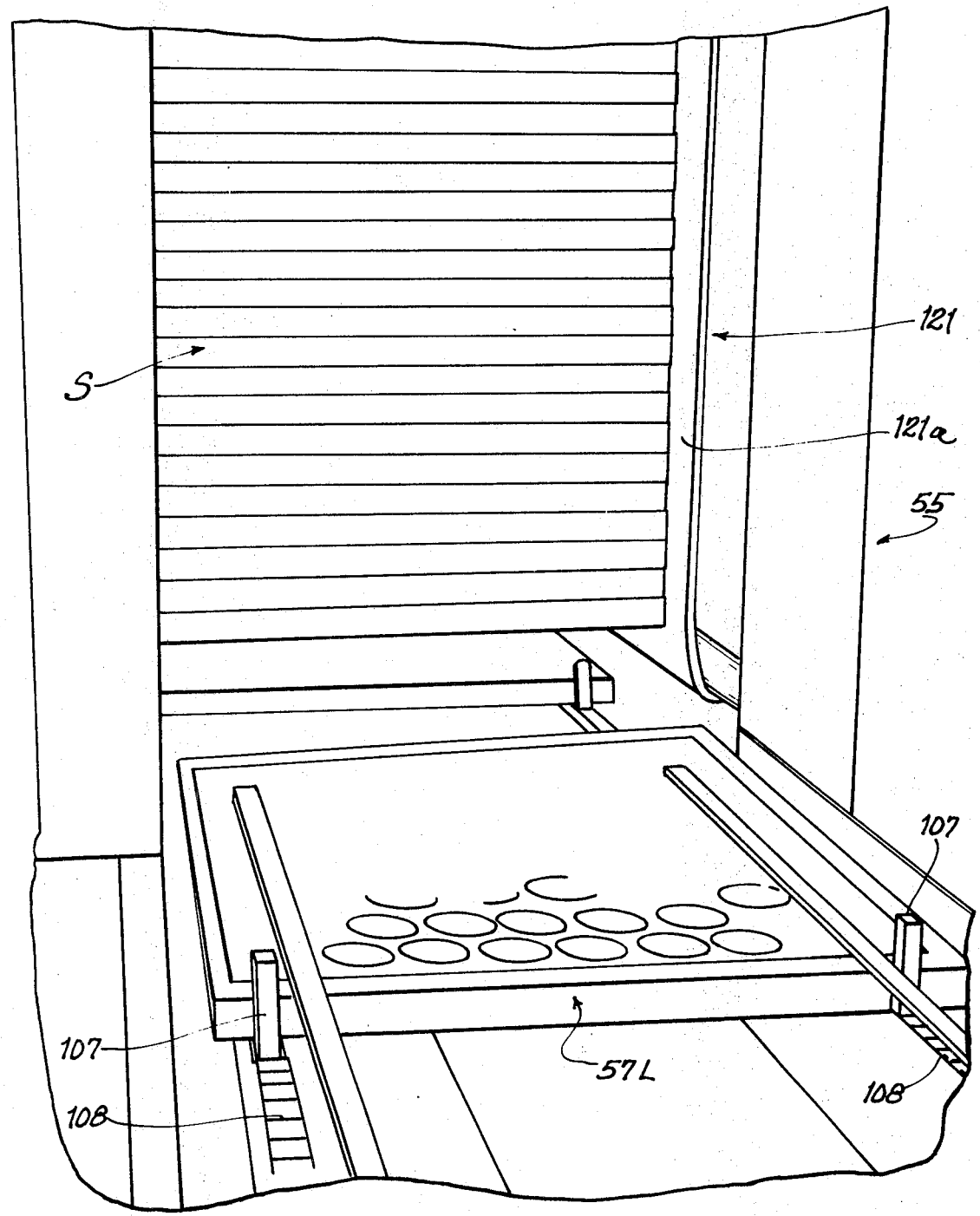
FIG. 16 is a fragmentary perspective view of the input side of one form of an optional stacking section.

The apparatus 50 is adapted to receive a plurality of collapsed tubular cartons 57T, see FIG. 2, at one end and to discharge the loaded cartons 57L, see FIG. 16, at the opposite end. The cartons 57 T and L in this instance are of a type disclosed in my copending continuation application Ser. No. 609,259 filed Jan. 13, 1967, and each is formed from a blank of paperboard of suitable point and includes a broad perforated top panel 58, see FIG. 4, a broad perforated bottom panel 60 of similar dimension, narrow imperforate side panels 61 foldably interconnecting opposed first peripheral portions of the top and bottom panels, and narrow end flaps 62a and b foldably connected to opposed second peripheral portions of the respective top and bottom panels. It is preferred that each side panel 61 be provided with foldable tabs 63, which are adapted to cooperate with the end flaps 62a and b to effect a seal end carton when the end flaps and tabs are folded into overlapping relation. The perforations or apertures 58a and 60a formed in the top and bottom panels 58 and 60 are of such size, number, and shape and in such an arrangement as to permit air to be readily circulated through the loaded carton and yet prevent portions of the product disposed within the closed carton 57L from becoming entrained in the circulating air.

When collapsed tubular carton 57T is initially fed into the apparatus, the bottom panel 60 faces downwardly, one of the first peripheral portions of the top panel 58 forms the leading edge L.E. of the carton, and the end flaps 62a and b extend laterally outwardly and in substantially coplanar relation with respect to the respective top and bottom panels.

FEED SECTION

The feed section 51, which may or may not form an integral part of the apparatus 50, is shown in FIGS. 2–4 and comprises an upright hopper member 64 for accommodating a plurality of cartons 57T arranged in stacked relation. The hopper member 64 is open at the upper end for loading and has substantially vertical walls 65 between which a stack of collapsed tubular cartons 57T is placed. Projecting from the interior surface of the front wall of member 64 is a cam ledge 66 which is spaced a substantial distance above the lower end of the member. As seen in FIG. 2, the upper surface of the ledge 66 which is in contact with the leading edges of the cartons 57T is tapered thus causing the leading edges of the cartons to be held up while the trailing edges of the cartons, which are opposite the leading edges, continue to move downwardly by reason of gravity until they contact a lower rear ledge 67. The cartons 57T, when in contact with ledges 66 and 67, assume an askewed position causing the center unsupported portions of the cartons to sag as seen in FIG. 2. The lowermost of the askewed cartons sags to such an extent that the leading edge thereof slides past ledge 66 and thus prevents adjacent cartons in the stack from sticking together.

A front ledge 68, which is spaced beneath ledge 66 and horizontally aligned with rear ledge 67, is provided adjacent the lower discharge end of the hopper member 64. Subsequent to the leading edge of the carton 57T slipping past ledge 66 it comes to rest at front ledge 68, whereupon the carton 57T assumes a substantially horizontal position.

Disposed intermediate ledges 67 and 68 and adjacent ledge 67 are a plurality of horizontally disposed substantially parallel support rollers 69. The peripheries of the rollers are tangential with respect to the horizontal plane of support of ledges 67 and 68. A spacing S is formed between the front ledge 68 and the adjacent one of the rollers 69 and functions as a discharge opening for the hopper member 64.

As seen in FIG. 3, front lower ledge 68 comprises a plurality of longitudinally spaced elongated sections 68a, b, and c. The voids or slots 68d, formed between ledge sections 68a–c, are each adapted to accommodate portions 70a of a stripper roller 70. The roller 70 is power driven by suitable drive means, not shown, to rotate in a predetermined timed sequence in a clockwise direction as seen in FIG. 2. Each roller portion 70a is provided with a radially extending lug or projection 70b. The amount of radial extension of each lug 70b is determined by the thickness of the leading edge L.E. of the lowermost carton 57T resting upon ledge 68 so that when the lug passes through the upper sector of rotation (such sector being that defined while the lug is in register with the slot 68d and is extending above the supporting plane of the ledge 66) the lug will engage the leading edge of the lowermost carton and cause distortion (e.g., buckling) of the top and bottom panels of said lowermost carton to such an extent that the leading edge moves past the ledge 68, see FIG. 4. In FIG. 4, by reason of the fact that only one carton is shown engaging the ledge 68, the top panel 58 buckles upwardly and the bottom panel 60 buckles downwardly; however, in instances where there are a number of collapsed tubular cartons 57T disposed within the hopper member 64, upward buckling of the top panel 58 of the lowermost carton will be restrained by the other cartons disposed thereabove. Under the latter conditions, therefore, the leading edge portion of the top panel of the lowermost carton will be bent downwardly, when the lugs 70b of the rotating stripper roller 70 contact said leading edge.

Once the leading edge portion of the lowermost collapsed tubular carton 57T has been bent or deflected by the stripper rolls 70 so that it is disposed within the space S, further downward bending of the leading edge is accomplished by a pivotally mounted arm 71 which has affixed to the distal end thereof a suction (vacuum) device 71a, which, when the arm is in its up position, will engage the underside of imperforate segments of the bottom panel 60. Upon reversing the direction of movement of arm 71 (e.g., moving in a counterclockwise direction as viewed in FIG. 2), the leading edge portion of the lowermost carton will be carried downwardly by a device 71a, until said edge portion contacts the periphery of an elongated horizontally disposed knurled feed roller 72, see FIG. 2. Roller 72, which is driven in a counterclockwise direction as seen in FIG. 2, is adapted to work in concert with a second horizontally disposed elongated knurled feed roller 73, the latter being driven to rotate in a clockwise direction. The horizontal axis of rotation of roller 73 is movable toward or away from the horizontal rotary axis of roller 72 in a timed sequence. When roller 73 is moved into close proximity with roller 72, the two rollers 72 and 73 will engage the deflected leading edge portion of the lowermost collapsed tubular carton 57T and cause the latter to slide transversely acros the support rollers 69 and out through space S at the bottom of the hopper 64 and onto a platform 74.

As the lowermost carton 57T is being moved by rollers 72 and 73, the suction effect of the device 71a on the underside of the bottom panel is released thereby facilitating movement of the carton between rollers 72 and 73.

After release of the carton by the arm device 71a, the arm 71 continues for a short distance its counterclockwise movement so that the device 71a will not interfere with the movement of the carton out through the bottom of the hopper. After the carton has passed between rollers 72 and 73, the arm 71 is once again actuated in a clockwise direction in timed sequence with the rotation of the stripper roll 70, so as to properly engage the next carton as it is deflected by the lugs 70b.

Other forms of carton-feeding mechanism may be utilized in lieu of that illustrated and just described.

ERECTING SECTION

Figure 5:
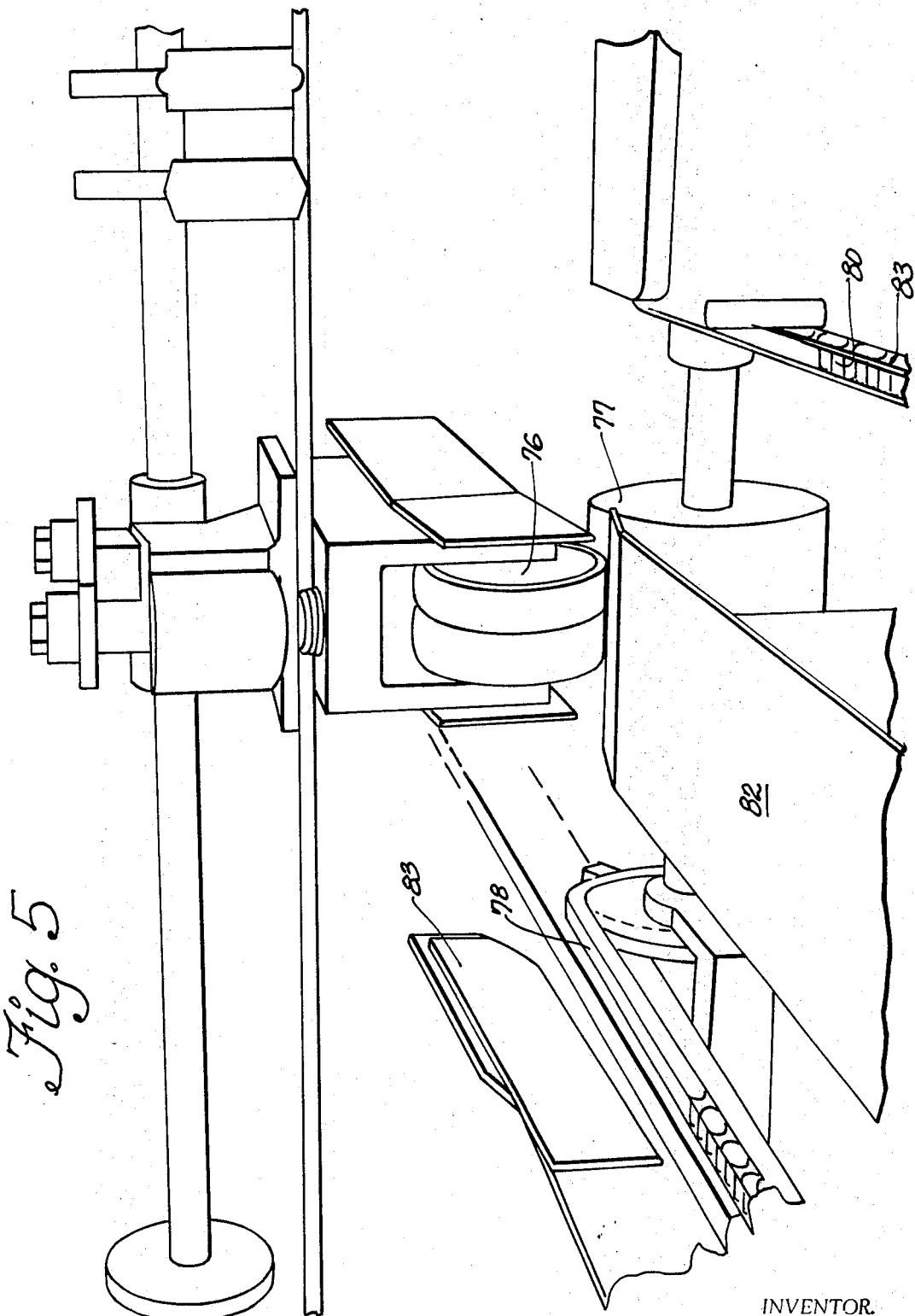
FIG. 5 is a fragmentary perspective view of the improved apparatus looking upstream toward the feed section and showing the first conveyor means.

Upon the segregated collapsed tubular carton reaching platform 74, it is moved forwardly (toward the left in FIG. 2) and passes between a pair of vertically disposed advance rolls 76 and 77, see FIG. 5. Roll 76 is mounted for vertical reciprocatory movement with respect to the driven advance roll 77. Advance roll 77 is ineffective in moving the collapsed tubular carton forward through the machine until roll 76 is moved downwardly. There is a time interval between when the carton is released from between feed rollers 72 and 73 and when advance roll 76 is moved downwardly. During such interval the carton is free to self-align itself with respect to a pair of drive chains 78 and 80, see FIG. 5. Each chain 78 and 80 is provided with a plurality of spaced lugs 81, see FIG. 11. Corresponding lugs 81 on the chains cooperate with one another to engage the trailing edge T.E. of the collapsed tubular carton 57T and move the latter through the erecting section 52.

An elongated support member 82 is disposed between chains 78 and 80 and is adapted to support the undersurface of the bottom panel 60 of the collapsed tubular carton 57T and thus prevent sagging of the carton as it is being moved by the chain lugs 81. Disposed outwardly of chains 78 and 80 are a pair of elongated guides 83 beneath which the end flaps and tabs of the collapsed tubular cartons 57T move as the latter are fed through the erecting section 52.

After the collapsed tubular carton 57T has moved forwardly a short distance the laterally extending end flaps 62a–b and tabs 63 thereof are plowed upwardly at substantially right angles with respect to the top and bottom panels 58 and 60 by a plurality of cooperating rollers 84a–b, 85a–b and 86a–b. The axes of rotation of rollers 84a, 85a and 86a are substantially horizontal whereas the axes of rotation of rollers 84b, 85b and 86b are disposed angularly outwardly from the vertical, see FIG. 6.

Figure 7:
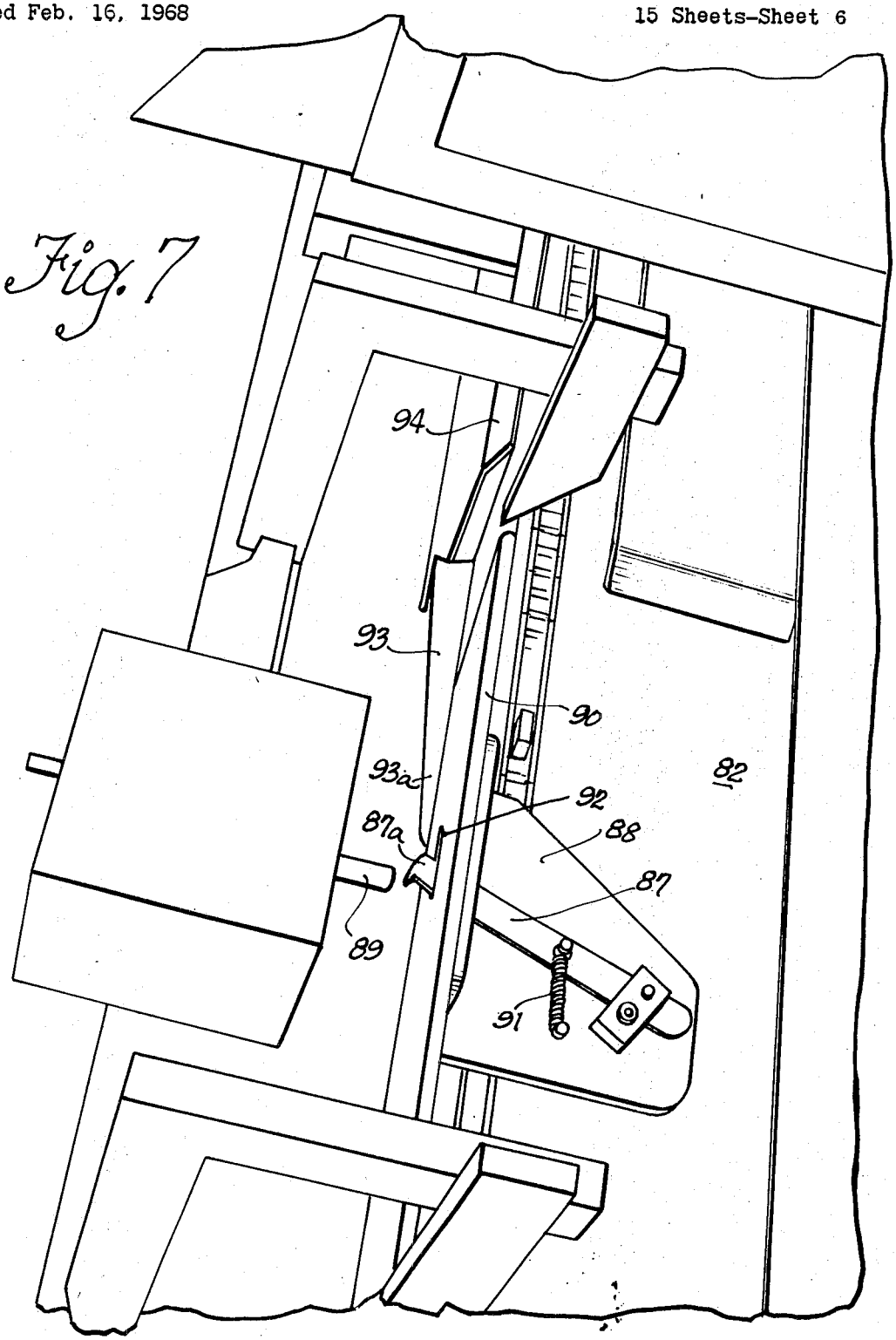
FIG. 7 is a fragmentary perspective view taken from above of a portion of the erection section.

Upon the upwardly folded end flaps and tabs leaving the last pair of cooperating rollers 86a–b, the leading edge of each upwardly folded end flap 62a connected to a side of the top panel 58 is engaged by the hook end 87a of a pivotally mounted arm 87, see FIG. 7. There is an arm 87 disposed adjacent each side of the erecting section.

Figure 6:
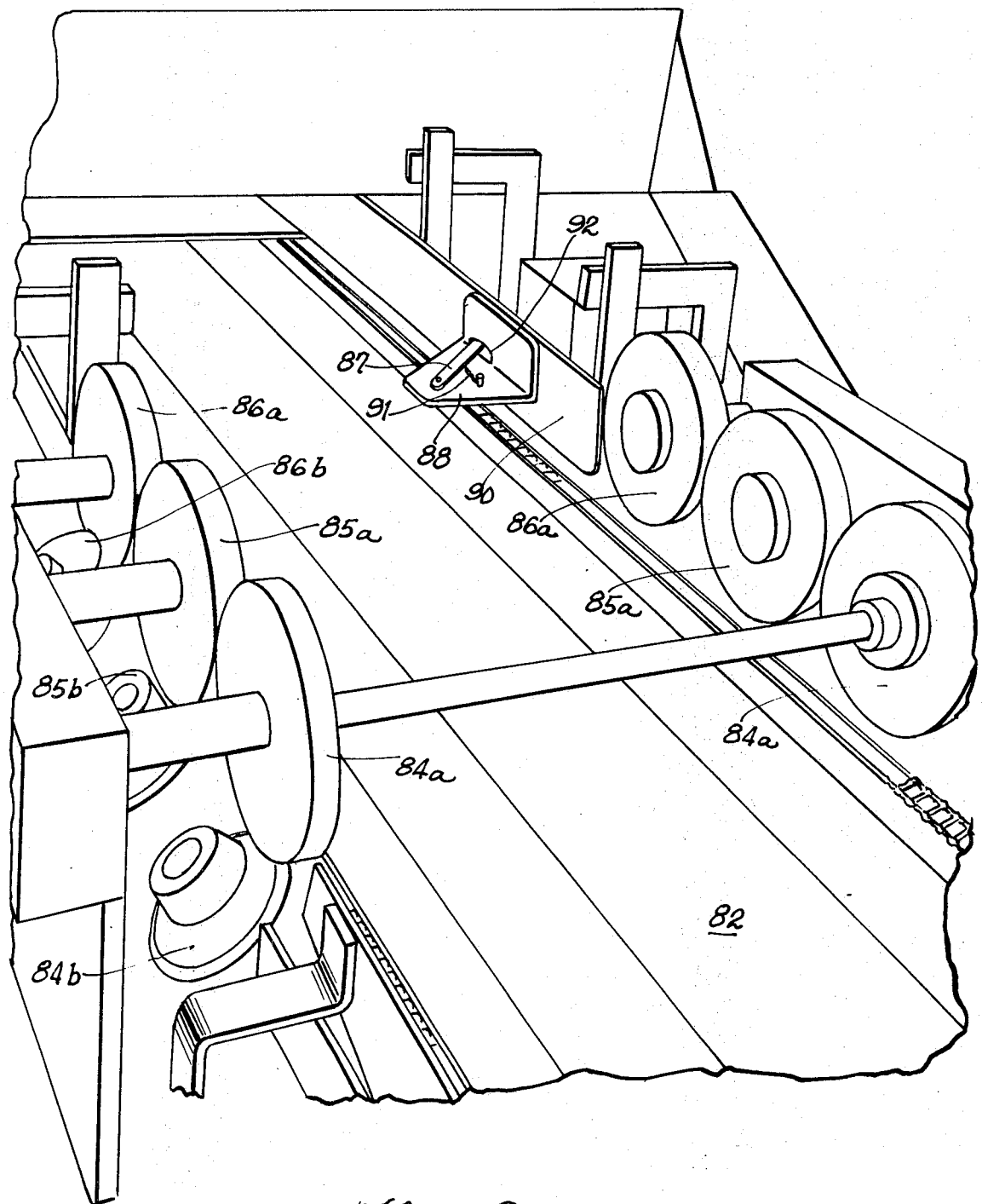
FIG. 6 is similar to FIG. 5 but looking downstream toward the erection section.

Each arm 87 is pivotally connected to a right angle bracket 88 which is secured to the inside surface of an adjacent guide member 90, see FIGS. 6 and 7. Arm 87 is biased in a counterclockwise direction by a small coil spring 91, as seen more clearly in FIG. 7. The hooked end 87a of arm 87 extends through an elongated slot 92 which is formed in the guide member 90 and the portion of the bracket connected thereto.

The function of arm 87 is that the hooked end hereof 87a is disposed in the path of movement of the upturned flaps and contacts the leading edge of the upturned end flap 62a and causes the latter to be flexed away from the adjacent upturned tab 63. Once the leading edge of the end flap 62a is flexed away from the tab, the latter and the upturned end flap 62b connected to the bottom panel 60 are engaged by a spear 93. The spear 93 is fixedly secured to the frame providing support for the erecting section 52 and is provided with a rearwardly extending tapered free end 93a. The hooked end 87a of arm 87, by spreading apart the leading edges of the upturned end flap 62a from the adjacent leading tab 63, provides a ready target for the spear end 93a. As the carton continues to move past the spear 93, tab 63 and flap 62b are plowed downwardly into substantially horizontal positions while flap 62a remains upright. To make certain that the trailing tab 63 remains upright, a horizontally disposed plunger 89 is provided which is caused to be extended and engage same as the trailing tab moves past, thereby disposing said tab inwardly of the spear-end 93a.

Figure 8:
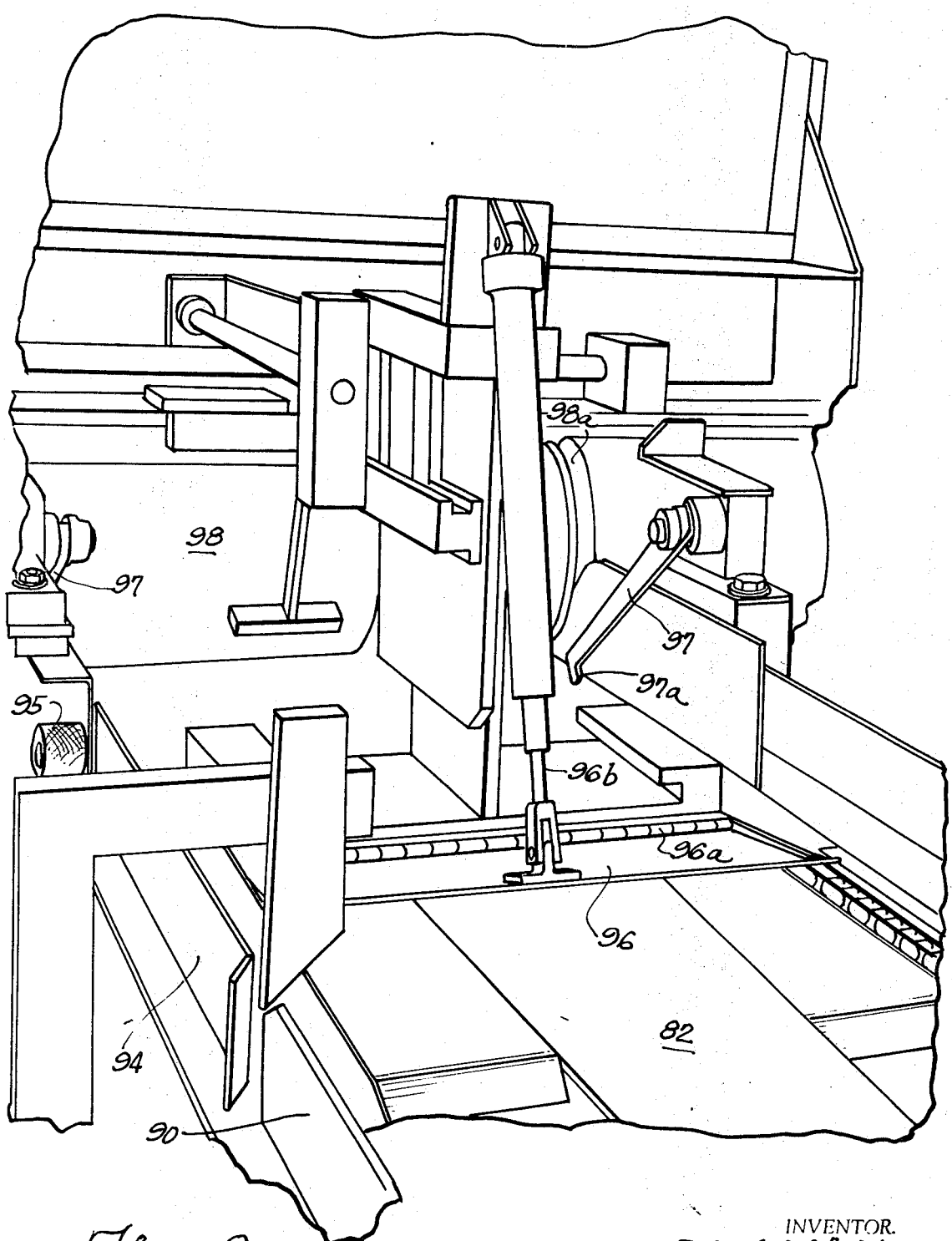
FIGS. 8–10 are similar to FIG. 7 but showing other portions of the erection section.

Subsequent to the downward plowing of the leading tab 63 and flap 62b, they are caused to pass beneath an elongated guide 94, see FIG. 8. The upright flaps, on the other hand, are deflected so that they are disposed on the inside surface of the guide 94. Once the downwardly plowed leading tab 63 and flap 62b pass beneath guide 94, they are engaged by a pair of knurled rollers 95 which are driven and positively move the collapsed tubular carton along the erecting section. The aforedescribed manipulation of the tabs and flaps occurs simultaneously on opposite sides of the moving carton.

Figure 9:
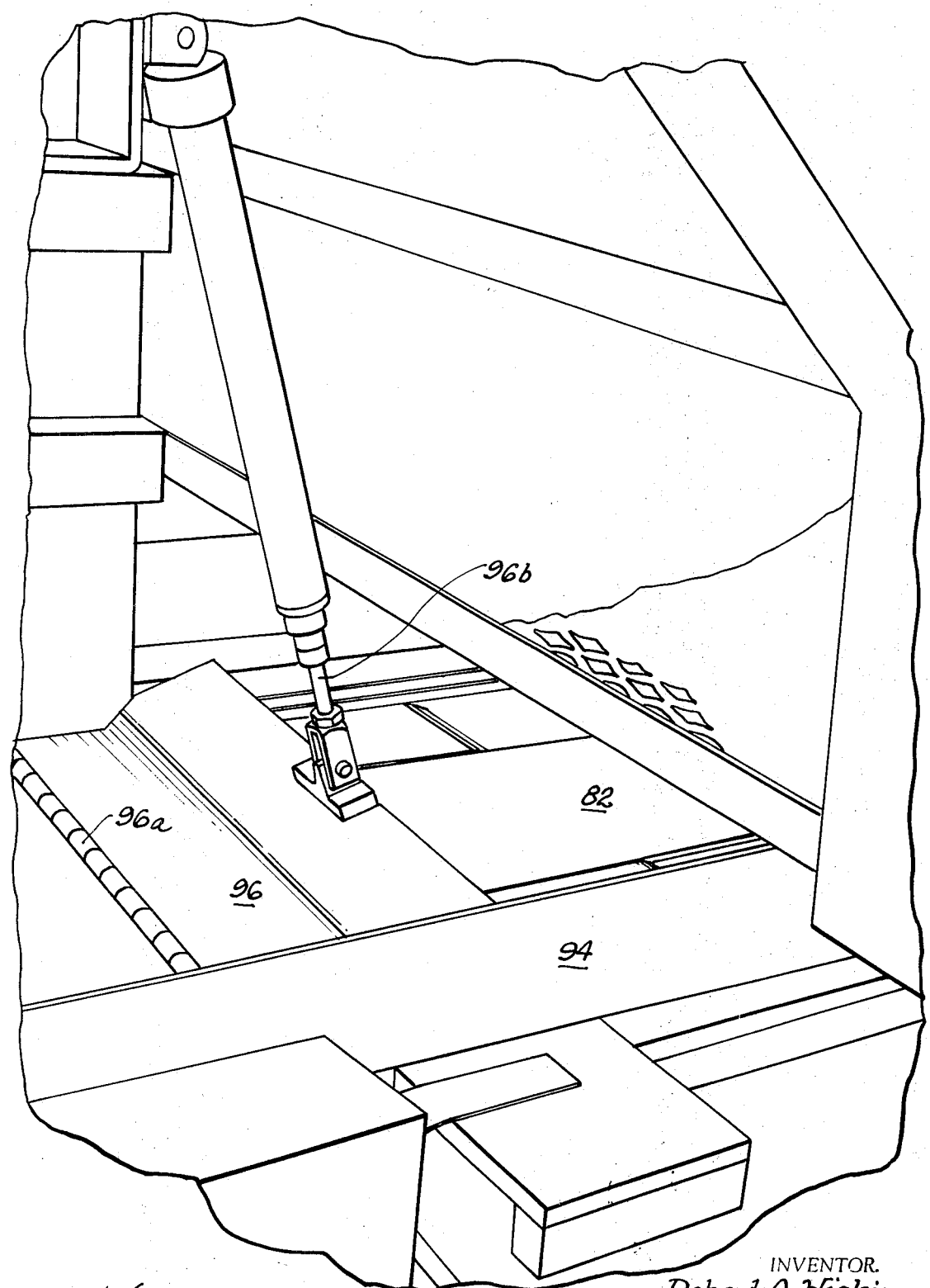
Figure 10:
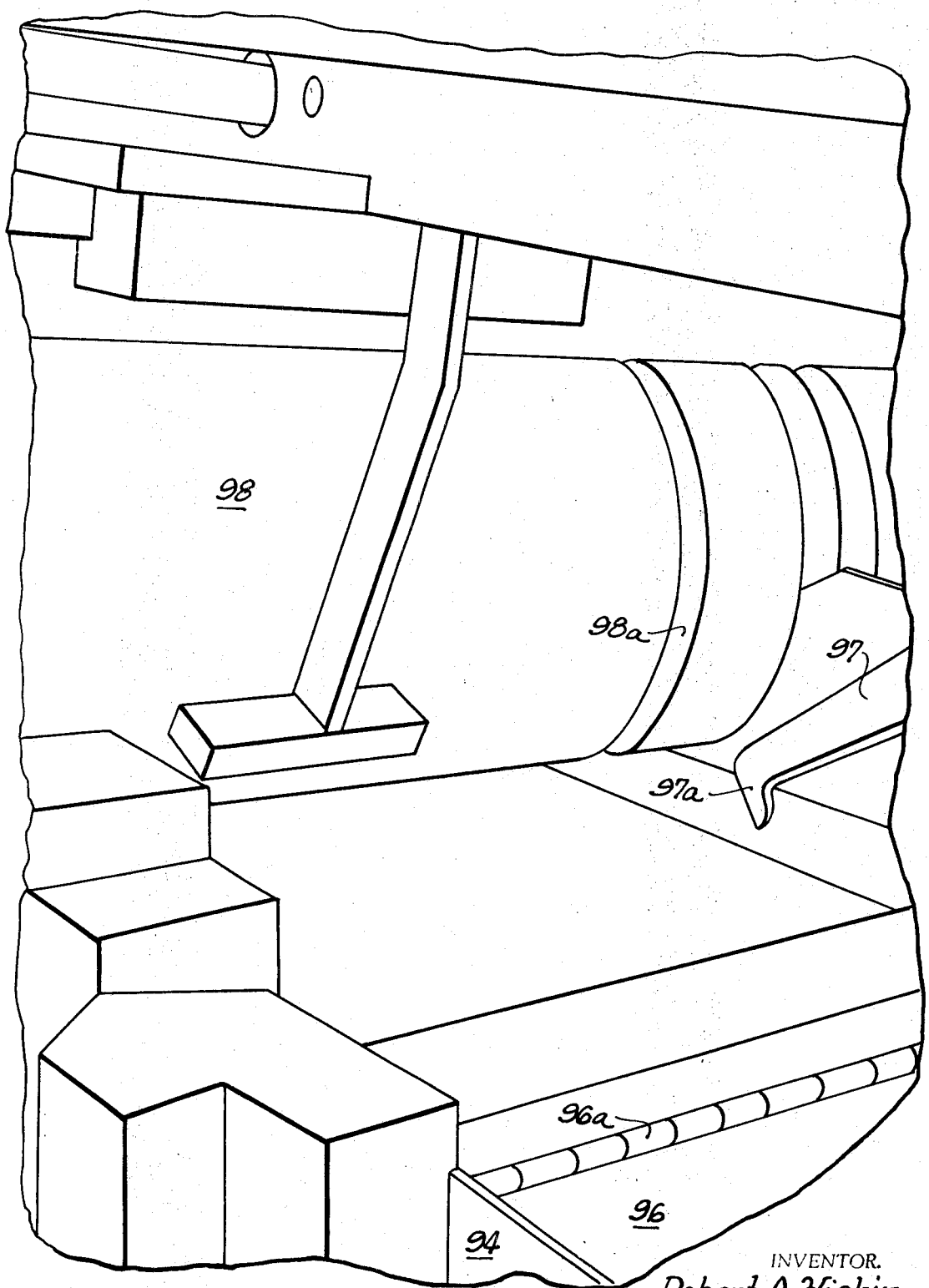

As the leading tabs 63 and flaps 62b move beneath guide 94, the center portion of the carton subtends a centrally disposed presser plate 96, which causes any warpage in the moving carton to be eliminated, see FIGS. 8 and 9. The plate 96 is pivotally mounted at 96a and the pivoting action of the plate is effected by a piston 96b. As the carton moves from beneath plate 96, the leading edge of the carton is engaged by a pair of pivotally mounted overhead elongated fingers 97, each of which has a hook-like free end 97a. Once the collapsed carton is engaged by the hooked ends 97a, the leading edge of the carton top panel 58 is slowed down in its forward movement while the bottom panel 60 continues its forward movement at its normal rate with the result that the carton is caused to assume an erected tubular position as the arms 97 are pivoted upwardly. The carton remains in its erected tubular condition only momentarily as the carton then passes beneath a breaker roll 98, which effects collapse of the tubular carton in the opposite direction from which it was originally collapsed. The hook ends 97a of the pivoting arms 97 engage the leading edge of the top panel of the carton a sufficient length of time before release thereof so that the corresponding edge of the bottom panel becomes the leading edge just before the carton is contacted by the breaker roll 98. To prevent any interference with the upward pivoting of the arms 97 by the breaker roll 98, a plurality of peripheral grooves 98a are formed in the exterior surface of the roll into which the ends 97a are free to move, see FIGS. 8 and 10. The presser plate 96 engages the rear portion of the top panel of the carton while the leading portion of the top panel is passing beneath the breaker roll and thus prevents any buckling of the top panel which might otherwise cause the formation of a kink or fold in the top panel rear portion when it passes beneath roll 98.

LOADING SECTION

Figure 11:
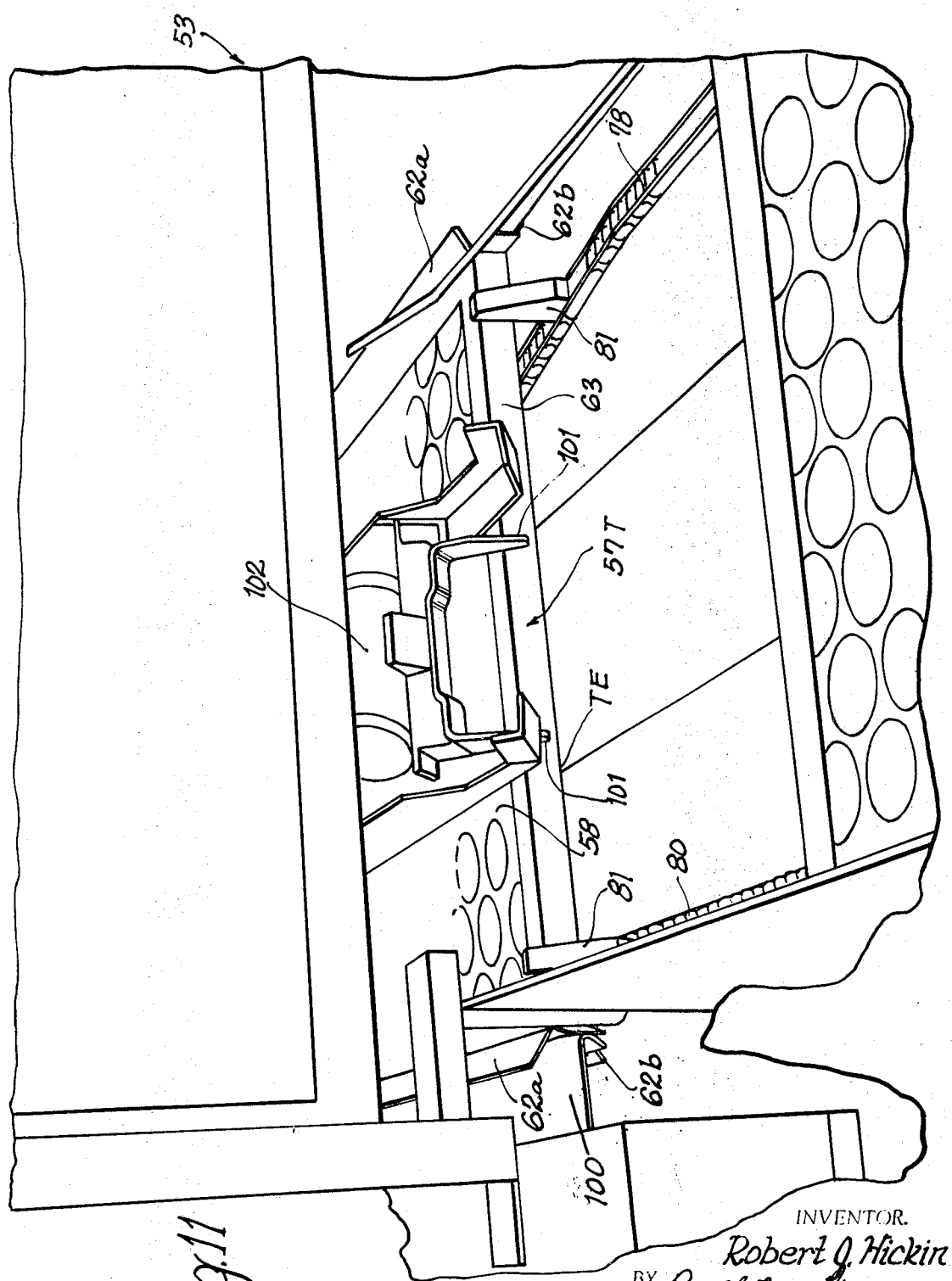
FIG. 11 is an enlarged fragmentary perspective view showing the input side of the loading section and with an erected carton tube disposed at the first station within the well.

Upon the carton in reverse collapsed tubular condition leaving the roll 98, the trailing edge of the top panel extends rearwardly the greatest amount and is engaged by flights or lugs 81, which cause the carton to once again assume an upright erected tubular position prior to the carton entering the loading section 53, see FIG. 11. As the erected tubular carton is moved forwardly by the lugs 81, the divergently extending end flaps at each side of the carton are moved into a straddling relation with respect to a pair of elongated horizontally disposed rails 100. As the trailing end of the carton enters the loading section 53 the lugs 81 disengage the carton and simultaneously therewith the said carton trailing end is engaged by a pair of depending fingers 101. The fingers 101 extend from an overhead chain or belt 102.

The fingers 101 push the cartons along the rails 100 so that two cartons may be simultaneously positioned in end to end relation thereon with a space interval of approximately 30 inches between the two cartons. The rails 100, which are in parallel relation, extend across the top of a well area 103, the latter forming a part of the loading section 53. The erected tubular cartons are retained on the rails 100 by reason of the end flaps 62a of each carton overlying the same.

Figure 12:
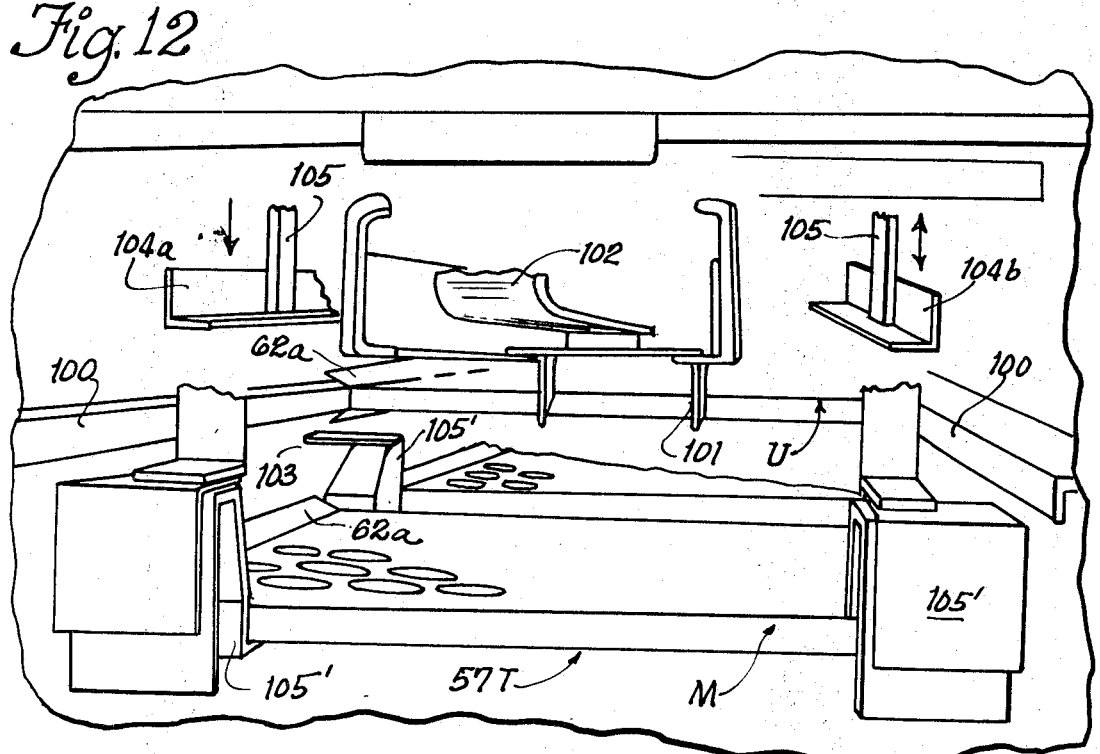
FIG. 12 is a fragmentary perspective view looking rearwardly toward the input side of the loading section.

Disposed above the rails 100 and in registered relation with the well area 103 are two pairs (only one pair being shown in FIG. 12) of elongated plunger rods 104a and b. One pair of rods is provided for each carton as it is supported on rails 100. Each plunger rod is disposed inwardly of but parallel to the adjacent supporting rail 100. Each pair of plunger rods moves vertically as a unit subsequent to the tubular carton having reached a predetermined station on the rails 100. Vertical reciprocatory motion is imparted to the pair of plunger rods 104a and b by a rack 105 extending upwardly from approximately the mid-length of each rod. The upper end of each rack 105, not shown, engages a suitable drive gear which is actuated during a predetermined time sequence. Upon the drive gear being actuated, the rods 104a and b move simultaneously downwardly a sufficient amount so as to engage the tubular carton disposed therebeneath and supported on the rails 100. The plunger rods continue their downward movement forcing the engaged tubular carton to move past the rails and at the same time cause the end flaps 62a to be deflected upwardly as they pass by the rails 100. The plunger rods 104a and b move downwardly a sufficient amount so that the engaged tubular carton will be free and clear of the rails 100 and come to rest upon four symmetrically arranged ledges or pedestals 105′, see FIG. 12. The arrangement of the ledges 105′ is such that they engage the underside of the carton at approximately its four corners and retain the tubular carton in a horizontal plane which is at approximately mid-depth of the well area 103. The tubular carton when in supporting engagement with the rails 100 is disposed at the upper station U in the well area 103, and when in supporting engagement with the ledges 105′ is disposed at an intermediate station M, see FIG. 12.

Figure 13:
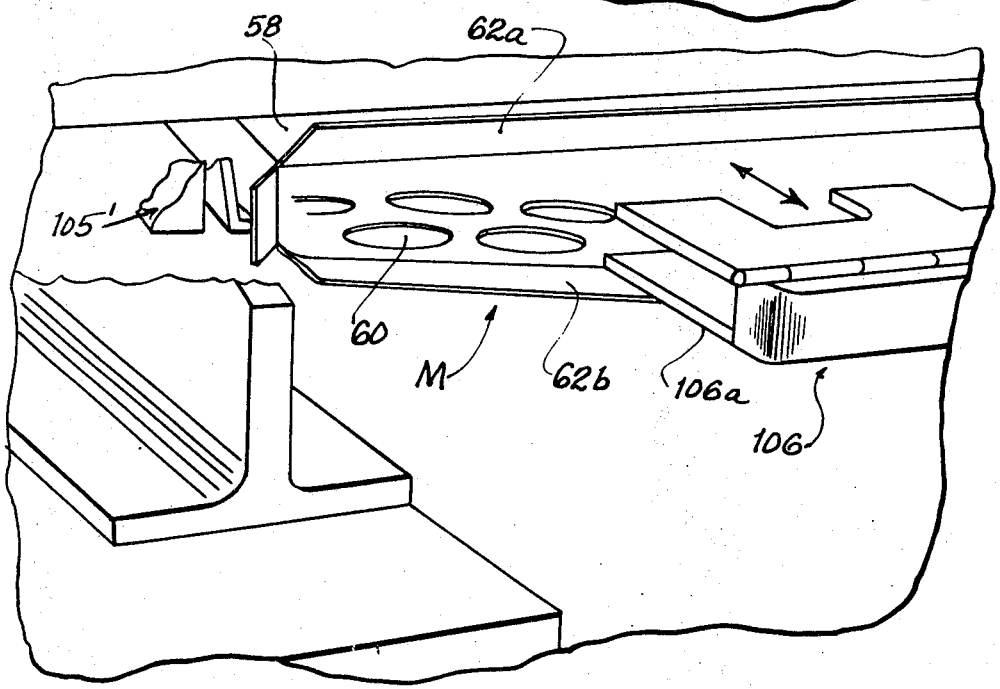
FIG. 13 is a fragmentary perspective view of the loading section and showing an erected carton tube disposed at the intermediate station and the reciprocating load means about to be extended through said tube.

In FIG. 13, an open end of the tubular carton when at intermediate station M is shown in perspective. When the carton has reached station M, the open ends of the carton are aligned with the longitudinal axis of an elongated loading arm 106 which is power actuated to move in a horizontal plane transversely between the top and bottom panels of the aligned erected tubular carton. Affixed to the free end of arm 106 is a jaw or clamping device 106a, the component parts of which are adapted to be actuated into closed or grasping position when the arm 106 is in its fully extended position, that is, when the device 106a has moved completely through the tubular carton and projects beyond the opposite open end of the carton. The jaw device 106a, when in such position, is disposed adjacent the medium feed section 56, see FIG. 1, at which location the component parts of the jaw device 106a engage an edge of the medium or product (e.g., air filter pad) and are actuated into grasping relation therewith. Upon the arm 106 reversing its direction of movement, that is retracting, the grasped medium, not shown, is pulled into the tubular carton between the top and bottom panels thereof until said medium has reached a properly aligned position therewith, at which point the movement of the arm stops temporarily and the jaw device 106a releases its grasp on the medium before continuing to its fully retracted position wherein the jaw device 106a is free and clear of the tubular carton.

Figure 17:
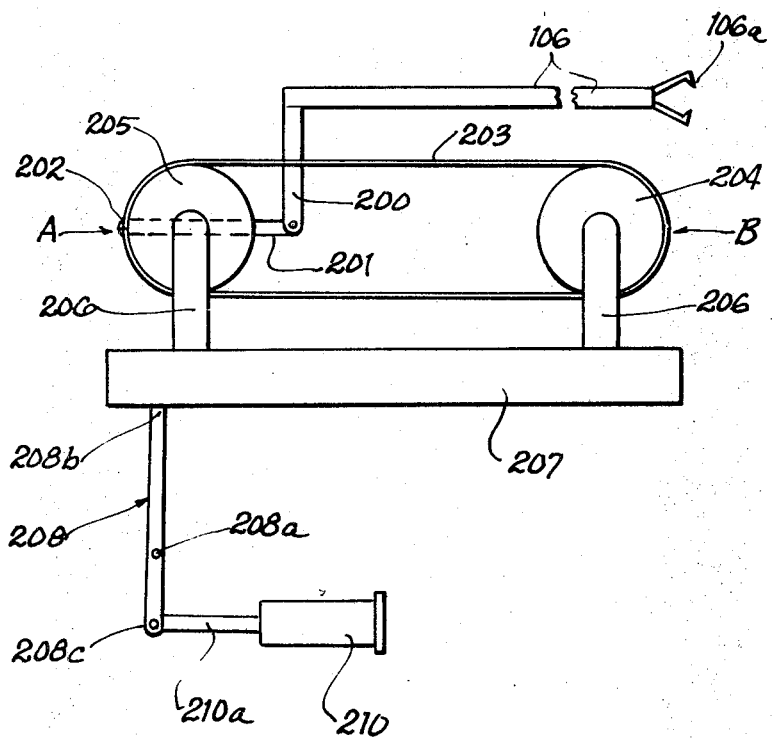
FIG. 17 is a fragmentary diagrammatic view of one form of load means incorporated in the loading section.

FIG. 17 discloses diagrammatically one form of mechanism for imparting reciprocatory movement to the loading arm 106. The arm, in this instance, is provided with a depending stub 200 which is affixed to an end of the arm opposite that to which the jaw device 106a is connected. Pivotally connected to the lower end of stub 200 is one end of an arm 201. The opposite end of arm 201, in turn, is pivotally connected at 202 to a link forming a part of an endless chain 203. The chain 203 engages a pair of horizontally spaced sprockets 204 and 205, one of which is power driven. Each sprocket is supported by a bracket 206 which extends upright from a carrier 207. The carrier in this instance is adapted to be selectively moved in a horizontal plane by an elongated actuating arm 208. The arm in the illustrated embodiment is pivoted intermediate its ends at a fixed point 208a. The upper end 208b of the arm 208 may be slidably disposed within a suitable slot, not shown, formed in underside of carrier 207. The opposite or lower end 208c of the arm is pivotally connected to a solenoid 210 or the like. By reason of the location of the pivot 208a on arm 208, the linear movement of the solenoid arm 210a is greatly amplified in the movement of carrier 207.

When the pivot connection 202 between arm 201 and chain 203 is disposed at the position A as shown in FIG. 17 with respect to the periphery of sprocket 205, the load arm 106 has reached a position of retraction wherein the jaw device 106a effects release of the filter medium within the tubular carton. On the other hand, when the pivotal connection assumes a position B with respect to sprocket 204, the load arm 106 is in its fully extended position whereby the jaw device 106a is adapted to be actuated to grasp a single medium from the section 56, see FIG. 1. When the chain-connected end of arm 201 reaches either position A or B, rotation of sprockets 204 and 205 is halted in order to permit actuation of the jaw device to effect either grasping or release of the filter medium. Once position A is reached and the jaw device 106a is actuated to release condition, solenoid 210 is automatically actuated causing carrier 207 to move horizontally to the left, as viewed in FIG. 17, a sufficient amount whereby the jaw device 106a is fully retracted from the loaded tubular carton, while the latter is poised at said intermediate position M within the well area 103. The sequence of operation of the sprockets 204 and 205, the jaw device 106a and the solendoid 210 may be readily determined by various switches and timers, not shown, arranged and interconnected in a manner well known in the automatic machine art.

Various other types of mechanisms may be utilized from that shown in order to effect controlled actuation of the load arm 106 and the jaw device 106a.

Upon the device 106a reaching its fully retracted position, the four ledges 105' are automatically actuated to a release position whereby the ledges thereof are withdrawn from beneath the loaded tubular carton and the latter moves downwardly due to the force of gravity to the lowermost station, not shown in the well area 103.

In order that the jaw device 106a can complete its full cycle of movement as aforedescribed, it is necessary that the tubular carton remain at rest at the intermediate station M. Such rest period or dwell time is effected notwithstanding the continuous feeding of the cartons to the input side of the loading section 53 by reason of the transverse or downward movement of the carton from the upper station U to the intermediate station M (approximately 10 inches) by the plunger rods 104a and b, and that alternate cartons are moved downstream (approximately 30 inches) to the fullest extent on the rails 100 before rods 104a and b are actuated.

CLOSING SECTION

Upon the loaded tubular carton reaching the lowermost station of the well area 103, the loaded tubular carton is contacted by a further series of lugs 107, see FIG. 16, which are carried by a lower chain or belt 108. The direction of movement of the lugs 107, when contacting the loaded tubular carton at the lowermost station of the well area 103, is in the same direction as the collapsed tubular carton moves through the erecting section 52, except in a lower horizontal plane.

As the lugs 107 move the loaded tubular carton away from the lowermost station and into closing section 54, the tabs 63 foldably connected to the opposite ends of the narrow front and back side panels 61 of the carton are plowed inwardly so as to overlie the open ends. Subsequently the lower end flaps 62b are then plowed into upright overlapping relation with the previously folded tabs 63. Plowing of both the tabs and lower end flaps may be accomplished by any suitable means well known in the art.

Figure 14:
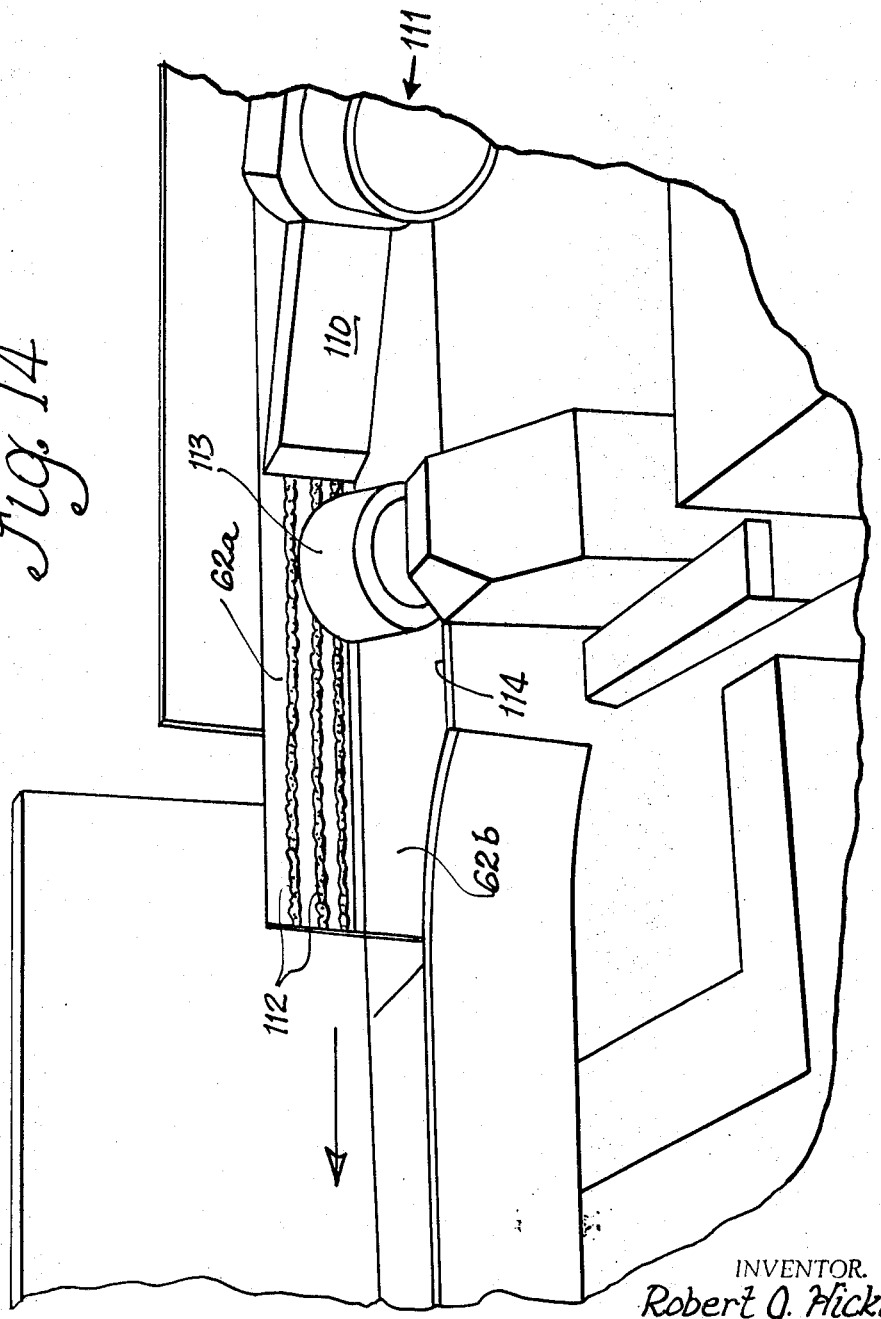
FIG. 14 is a fragmentary perspective view of a part of the closing section and showing the relative disposition of an adhesive applicator and a crimping roller.

The upper end flaps 62a have already assumed a partially upright position while moving through the well area 103 of the loading section 53. However, to assure that flaps 62a assume proper upright positions, they may engage suitable guides, not shown, which are properly positioned along the path of movement of the loaded tubular carton. After the upper end flaps 62a are in their proper upright positions and the tabs and lower end flaps have been folded as indicated, the inside surface of the end flaps 62a are contacted by the nozzle 110 of an adhesive applicator 111. The adhesive 112 in a wet condition is applied in a plurality of continuous, parallel, spaced ribbons, see FIG. 14.

Disposed in close proximity to the discharge end of nozzle 110 and downstream therefrom is a pinch roller 113 which is adapted to engage the lower end flap 62b at its foldline connection with the carton bottom panel 58 and form a crimp 114 thereat. The crimp 114 serves to retain the folded lower end flap 62b in its upright folded position.

Figure 15:
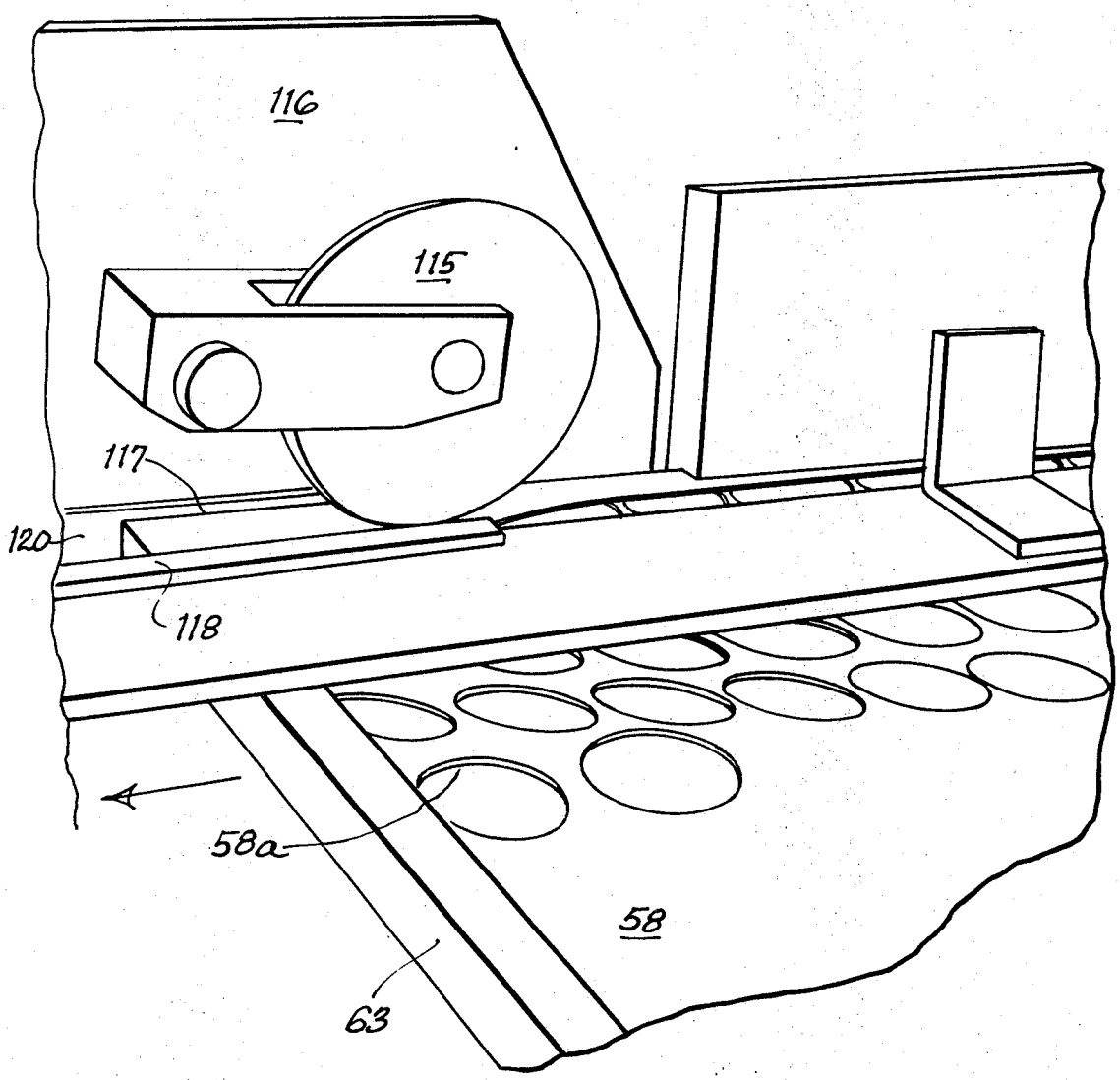
FIG. 15 is a fragmentary perspective view of another part of the closing section and showing the end flaps in overlapping sealing relation and a second crimping roller contacting the juncture between the top panel and one end flap connected thereto.

Upon the loaded carton having moved past the pinch roller 113, the upper end flaps 62a are plowed downwardly into overlapping bonded relation with the exposed surface of the folded lower end flaps 62b. To facilitate retention of the upper end flaps 62a in their overlapping bonded relation, the closed carton then passes, see FIG. 15, beneath a pair of second pinch rollers 115 (only one being shown in FIG. 15). Each roller 115 is pivotally mounted on a suitable frame bracket 116 and is biased in a clockwise direction so that roller 115 will impart a slight crimp 117 to the top panel 58 of the carton at the foldline connection between the upper end flap 62a and the top panel. During the crimping action by roller 115 the top of the loaded closed carton passes beneath a hold-down guide 118 and the folded end flaps 62a are confined between upright elongated guides 120.

OPTIONAL STACKER SECTION

Following the formation of the crimps 117 by pinch rollers 115, the sealed carton may, if desired, be moved by the lugs 107 between a pair of short-cooled compression belts, not shown, or into the stacker section 55, see FIG. 16. The stacker section 55 is an optional attachment and in the illustrated embodiment includes a pair of spaced, parallel, vertically disposed belts 121, only one being shown in FIG. 16. The inwardly disposed or adjacent legs or runs 121a of the belts are adapted to engage the sealed ends of the closed cartons. The spacing between the adjacent legs of the belts is such that the cartons are frictionally held therebetween. As each carton is fed into the stacker section 55 it is spotted beneath the pair of belts 121 whereupon a pair of plungers, not shown, which are disposed beneath the spotted carton are actuated to an extended position causing the spotted carton to be raised up into the spacing between the belts 121.

Upon the raised carton being frictionally engaged by the belts, the plungers are automatically retracted to a position beneath the plane of support of the cartons being fed into the stacker section. Upon the spotted carton being raised up by the plungers the spacing between the belts is momentarily enlarged slightly so as to facilitate disposition of the carton therebetween. As soon as the plungers commence retracting, the belts return to their normal spacing.

It will be noted in FIG. 16 that each spotted carton as it is raised, contacts the bottom carton of a stack S'. The movement of hte adjacent legs 121a of the belts is only in an upward direction. By having the cartons arranged in a stacked relation any tendency of the individual cartons to sag or buckle is avoided. Furthermore, the belt legs 121a serve to retain the outer end flaps 62a in overlapping relation until a secure adhesive bond is made with the overlapped flaps 62b.

If desired two pairs of belts 121 may be utilized in side by side relation. In this latter arrangement alternate cartons are spotted beneath one pair of belts.

Once a stack of given height is formed, the desired stack may be automatically or manually removed from section 55, if desired. In certain operations the stacker section 55 may be eliminated and the cartons automatically fed into a storage zone or into shipping containers of proper size and shape.

In order to accommodate cartons of varying sizes, the apparatus 50 may be adjusted by having the guides and rails disposed to one side of the moving cartons moved as a unit or individually either toward or away from the guides and rails disposed on the opposite side of the moving cartons. Such adjustment may be accomplished by a suitable threaded bolt or stud carried by a stationary frame member and which engages a compatible internally threaded opening formed in a movable frame member. The axis of the bolt or stud is transverse to the direction of movement of cartons through the apparatus. Such means for effecting such size adjustment is well understood in the machine art.

In lieu of the feed section hopper 64 various other means may be utilized to effect feeding of the cartons in collapsed tubular condition into the apparatus 50.

Thus it will be seen that an apparatus has been provided which readily handles a flimsy type folding carton, loads same with a pliable or flimsy product, and closes the loaded carton in an effective and expeditious manner. The foregoing manipulations imparted to each carton are readily and smoothly accomplished by the improved apparatus because when such occurs, either one pair or both pairs of the end flaps of the carton are angularly disposed with respect to the top and bottom panels thereof.

While particular embodiments of the invention have been shown and/or described, it will be understood, of course, that the invention is not limited thereto since modifications may be made by those skilled in the art in light of the foregoing teachings. Therefore, it is contemplated by the appended claims to cover any such modifications as fall within the true spirit and scope of the invention.

I claim:

1. An apparatus for loading a thin pliable product into a shallow folding carton, the latter initially assuming a collapsed tubular condition and provided with a broad top panel, a broad bottom panel, narrow side panels foldably interconnecting opposite first peripheral portions of the top and bottom panels, and pairs of narrow substantially horizontally extending end flaps foldably connected to opposite second peripheral portions of the top and bottom panels; said apparatus comprising first conveyor means for successively moving in one substantially horizontal direction individual collapsed tubular cartons with the bottom panel of each collapsed tubular carton facing downwardly and a first peripheral portion of the top panel thereof defining a leading edge; an erection section provided with first means disposed adjacent said conveyor means and within the path of carton movement for contacting and effecting upward folding of the end flaps connected to the carton top panel, and pivotally mounted second means spaced from said first means for yieldably and resistantly engaging the leading edge-defining first peripheral portion of the top panel of the moving collapsed tubular carton and contacting the previously upwardly folded end flaps connected to the carton bottom panel to effect relative upward and rearward movement of the top panel with respect to the bottom panel to form a set-up carton tube with the top and bottom panels thereof in vertically spaced relation; and a loading section provided with first means for interrupting at a predetermined location movement of the carton tube from said erection section, and operable second means mounted for reciprocatory movement adjacent said location, said second means including an elongated arm, an adjustable product-engaging element mounted on one end of said arm, and a drive unit operatively connected to the other end of said arm for effecting movement of said arm, said loading section second means being operable, while the carton tube is at rest at said location, to extend said arm and product-engaging element as a unit through the open end of the carton tube, said element being adjustable to engage a product upon reaching the terminus of said extending movement, said arm and product-engaging element being operable as a unit to reverse the direction of movement to effect pulling of the engaged product into the carton tube, said product-engaging element being adjustable while said arm is at rest to effect release of the pulled product upon the latter reaching a predetermined aligned position with respect to the carton tube top and bottom panels, and said arm and product-engaging element being operable as a unit to continue movement in said reversed direction to a position exteriorly of the loaded carton tube; and second conveyor means for moving the loaded carton tube away from said location.

2. The apparatus of claim 1 wherein said first conveyor means moves the collapsed tubular carton in one plane and said second conveyor means moves the loaded carton tube in a second plane vertically spaced with respect to said one plane, and the reciprocating second means of said loading section is operable relative to a set-up carton tube only when the latter is at rest in a plane disposed intermediate the planes of movement of said conveyor means.

3. The apparatus of claim 1 including a closing section spaced from said loading section and provided with a first means disposed adjacent said second conveyor means and the path of movement of the loaded carton tube and having a protruding portion for treating a surface of one end flap of each pair to render same bondable, and second means downstream of said closing section first means for folding each pair of end flaps into overlapping bonded relation to form a loaded seal end carton.

4. The apparatus of claim 3 wherein the closing section first means comprises an adhesive applicator which slidably contacts and coats the inner surface of the upwardly folded end flaps connected to the carton top panel, and said closing section second means includes a roller spaced from said applicator for contacting the loaded carton tube at each juncture of one of the end flaps and the bottom panel and imparting thereto a crimp along the foldline connection.

5. The apparatus of claim 1 wherein said erection section second means includes a pivotally mounted element disposed above the path of movement of the collapsed tubular carton by said first conveyor means, a portion of said element yieldably engaging the leading edge of the moving collapsed tubular carton and imparting thereto a drag force, and power driven friction roller means disposed adjacent the path of movement of the collapsed tubular carton and frictionally contacting the end flaps connected to the carton bottom; said friction roller means imparting a positive pulling force on the contacted end flaps in the direction of movement of the collapsed tube by said first conveyor means, said friction roller means and said pivotally mounted element being simultaneously operative upon the moving collapsed tubular carton to effect erection thereof to form a set-up carton tube.

6. The apparatus of claim 5 wherein said erection section includes calendar rolls spaced downstream from said pivotally mounted element and said friction roller means and between which the carton tube, upon leaving said element and friction roller means, is caused to pass to effect a carton of reversed collapsed tubular condition from that of the initial collapsed tubular condition, and a plow element spaced downstream of said calendar rolls and disposed within the path of movement of the reversed collapsed tubular carton to effect downward folding of the end flaps connected to the bottom panel; said plow element upon contacting the carton end flaps effecting erection of the carton to form a squared carton tube with the end flaps connected to the top panel extending upwardly and the end flaps connected to the bottom panel extending downwardly.

7. The apparatus of claim 2 wherein the loading section includes a well, a pair of spaced parallel elongated guides disposed within the path of movement of the carton tube by said first conveyor means and spanning the upper end of said well; each guide engaging the carton tube between the end flaps of each pair of end flaps whereby the carton tube is supported by the end flaps connected to the top panel resting upon said guides, plunger means disposed above said guides in registered relation with said well, said plunger means being actuated, upon the carton tube being supported by the guides, to contact the carton tube and move same downwardly into the well free and clear of said guides, adjustable stop means disposed within said well and against which the carton tube is temporarily positioned by said actuated plunger means; said adjustable stop means effecting disposition of the carton tube in said intermediate plane, and control means for said stop means to effect adjustment of the latter to a carton tube-release position subsequent to the product being aligned within the carton tube whereby the loaded carton tube is free to be engaged and moved by said second conveyor means.

8. The apparatus of claim 1 wherein said erection section includes a yieldably mounted finger means disposed downstream of said erection section first means and within the path of movement of the upwardly folded end flaps and yieldably engageable with the leading portions of the upwardly folded end flaps connected to the carton top panel to effect flexure of the latter end flap leading portions with respect to the corresponding portions of the end flaps connected to the carton bottom panel, and spear means mounted adjacent to and downstream of said finger means and within the path of movement of the pairs of end flaps for effecting outward and downward relative movement of the whole of each end flap connected to the carton bottom panel with respect to the adjacent upwardly folded end flap connected to the carton top panel; said finger means and spear means being disposed intermediate said erection section first and second means.

9. The apparatus of claim 2 wherein said loading section includes a well having the upper end thereof aligned with the plane of movement of said first conveyor means and the lower end thereof aligned with the plane of movement of said second conveyor means, first support means for temporarily retaining an erected carton tube at the upper end of said well, adjustable second support means positioned within said well and spaced beneath said first support means for temporarily retaining an erected carton tube at a position of rest intermediate the planes of movement of said first and second conveyor means while the carton tube is being loaded with a product, plunger means disposed above said first support means for moving an erected carton tube from said first to said second support means while the top and bottom panels of the carton tube are substantially horizontally disposed, and control means connected to said adjustable second support means to effect adjustment thereof to a carton tube-release position subsequent to loading of the carton tube.

10. The apparatus of claim 9 wherein the dimension of said well is such that two horizontally spaced carton tubes can be simultaneously accommodated therein.

11. An apparatus for loading a product into a foldable tubular carton, the latter having broad top and bottom panels and closure flaps at opposite open ends thereof, comprising first means for moving a collapsed tubular carton in a predetermined direction, the carton closure flaps extending laterally with respect to the carton movement in said predetermined direction; second means adjacent said first means and positionable within the path of movement of the collapsed tubular carton for engaging and squaring up same while the carton is resting upon one of its broad panels so as to form a tube having the closure flaps thereof in an unfolded condition; a product-feed station disposed downstream of said second means, said first means depositing a squared-up tubular carton at said product-feed station; adjustable third means adjacent said feed station for loading a product into said carton tube, said third means including an elongated arm adjustable in one direction so as to extend through one end of the carton tube and out the other end and then adjustable in the opposite direction so as to be retracted from the tube, and an adjustable product-engaging element carried by said arm, said element engaging a product when said arm is fully extended and causing the engaged product to be pulled into and released within the tube upon said arm retracting from its extended position; fourth means for moving a loaded carton tube away from said product-feed station; and fifth means disposed downstream of said product-feed station and engaging the carton closure flaps and folding same into closing relation; the tubular carton, when engaged by said second and fourth means always having at least one closure flap at each end thereof transversely disposed with respect to one of the carton broad panels.

12. The apparatus of claim 11 including a unit for successively feeding to said first conveyor means individual cartons in the initial collapsed tubular condition, said unit comprising a hopper member for accommodating a plurality of the cartons arranged in stacked relation, said hopper member being provided with a first ledge for engaging the leading edge of the lowermost carton of the stack, and a second ledge spaced from said first ledge for engaging the edge of the lowermost carton opposite the leading edge thereof; rotatably mounted stripper means disposed adjacent said first ledge and cooperating therewith, when in a predetermined sector of rotation to contact the supported leading edge of the lowermost stacked carton and effect disengagement thereof from said first ledge and subsequently imparting to the carton leading edge a downward force; and a pair of driving rollers disposed in spaced relation beneath said first ledge, one of said rollers being adjustable toward and away from the other in time sequence with the rotation of said stripper means, said rollers, when adjusted away from each other, being adapted to receive the disengaged leading edge of the lowermost stacked carton and, when adjusted toward one another, being adapted to engage and move the lowermost stacked carton away from said hopper member.

References Cited
UNITED STATES PATENTS

| | | | |
|---|---|---|---|
| 3,134,309 | 5/1964 | Weber et al. | 53—186 X |
| 3,333,514 | 8/1967 | Jones | 53—186 X |
| 3,350,841 | 11/1967 | McDonald | 53—186 |
| 2,906,392 | 9/1959 | Galloway | 53—186 X |
| 3,129,542 | 4/1964 | Fahrenbach | 53—186 X |
| 3,083,510 | 4/1963 | Ganz | 53—186 X |

THERON E. CONDON, Primary Examiner

H. M. CULVER, Assistant Examiner

U.S. Cl. X.R.

53—169

PO-1050
(5/69)

UNITED STATES PATENT OFFICE
CERTIFICATE OF CORRECTION

Patent No. 3,541,760               Dated   November 24, 1970

Inventor(s)   ROBERT J. HICKIN

It is certified that error appears in the above-identified patent and that said Letters Patent are hereby corrected as shown below:

| | |
|---|---|
| Column 1, line 12 | "disclosure" should be --invention-- |
| Column 3, line 52 | Serial No. "609,259" should be --609,258 (now abandoned)-- |
| Column 4, line 74 | "roller" should be --roll-- |
| Column 5, line 25 | "acros" should be --across-- |
| Column 8, line 45 | after "in" insert --the-- |
| Column 8, line 48 | after "pivot" insert --point-- |
| Column 10, line 37 | "hte" should be --the-- |
| Column 12, line 58 | after "guides," insert --and-- |

Signed and sealed this 6th day of April 1971.

(SEAL)
Attest:

EDWARD M. FLETCHER, JR.
Attesting Officer

WILLIAM E. SCHUYLER, JR.
Commissioner of Patents